US007100169B2

(12) United States Patent
Carney et al.

(10) Patent No.: US 7,100,169 B2
(45) Date of Patent: Aug. 29, 2006

(54) METHOD, SYSTEM, AND PROGRAM FOR TRANSMITTING NOTIFICATION TO AN INPUT/OUTPUT DEVICE

(75) Inventors: Dennis Michael Carney, Louisville, CO (US); Harry Reese Lewis, Jr., Longmont, CO (US); Stephen Goddard Price, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 09/907,293

(22) Filed: Jul. 17, 2001

(65) Prior Publication Data

US 2003/0018829 A1 Jan. 23, 2003

(51) Int. Cl.
G06F 3/00 (2006.01)
G06F 3/12 (2006.01)
G06F 13/10 (2006.01)

(52) U.S. Cl. .......................... 719/321; 719/318; 710/6; 710/7; 710/8; 710/10; 710/19; 710/20; 710/48; 399/38

(58) Field of Classification Search ........ 719/321–327, 719/318; 710/6–10, 17, 7, 19, 20, 48; 399/38
See application file for complete search history.

(56) References Cited

U.S. PATENT DOCUMENTS

| 5,220,674 | A | * | 6/1993 | Morgan et al. ............. 709/223 |
| 5,272,651 | A | * | 12/1993 | Bush et al. .................... 703/16 |
| 5,489,935 | A | | 2/1996 | Dornier |
| 5,589,923 | A | | 12/1996 | Lee et al. |
| 5,594,672 | A | | 1/1997 | Hicks |
| 5,708,819 | A | * | 1/1998 | Dunnihoo ................... 713/323 |
| 5,848,281 | A | * | 12/1998 | Smalley et al. ............. 713/322 |
| 5,930,551 | A | | 7/1999 | Nakazato et al. |
| 5,954,819 | A | * | 9/1999 | Kenny et al. ................ 713/322 |
| 6,031,624 | A | | 2/2000 | Murphy |
| 6,094,546 | A | | 7/2000 | Nakazato et al. |
| 6,359,642 | B1 | * | 3/2002 | Smith et al. ................ 347/247 |
| 6,453,268 | B1 | * | 9/2002 | Carney et al. .............. 702/186 |
| 6,584,573 | B1 | * | 6/2003 | Wunderlich et al. ........ 713/322 |
| 6,606,164 | B1 | * | 8/2003 | Irie et al. .................... 358/1.15 |
| 6,654,895 | B1 | * | 11/2003 | Henkhaus et al. .......... 713/320 |
| 6,681,245 | B1 | * | 1/2004 | Sasagawa .................... 709/206 |

(Continued)

FOREIGN PATENT DOCUMENTS

JP 07156512 A * 6/1995

OTHER PUBLICATIONS

Person, Ron. "Using Windows 95, Special Edition." Que Corporation. Chapter 25, 1995, pp. 771-793.*

(Continued)

Primary Examiner—Lewis A. Bullock, Jr.
(74) Attorney, Agent, or Firm—William K. Konrad; Konrad Raynes & Victor LLP (57) ABSTRACT

Provided is a method, system, and program for sending notification to an Input/Output (I/O) device comprised of multiple components of an event from an originating device that transmits data to the I/O device. The originating device detects a notification event and generates a notification message in response to the detected notification event to transmit to the I/O device. In response to receiving the notification message, the I/O device activates at least one of the multiple components. The notification message may be transmitted to the I/O device on a first port at the I/O device, where data is received at a second port at the I/O device. In response to receiving the notification message on the first port, the I/O device activates at least one of the multiple components.

46 Claims, 4 Drawing Sheets

U.S. PATENT DOCUMENTS 6,707,574 B1 * 3/2004 Freeman et al. .............. 358/1.9

OTHER PUBLICATIONS

"The PC Technology Guide," pp. 1-8 [online] [retrieved on Mar. 13, 2001]. Retrieved from PCTechguide.com.

Microsoft Corp. "Print Dialog Box," pp. 1-3 [online] [retrieved on Mar. 14, 2001]. Retrieved from http://microsoft.com.

Microsoft Corp. "PrintDlg," pp. 1-2 [online] [retrieved on Mar. 14, 2001]. Retrieved from http://microsoft.com.

Microsoft Corp. "Using the Print Dialog Box," pp. 1-2. [online] [retrieved on Mar. 14, 2001]. Retrieved from http://microsoft.com.

"RFC 3014. 'Notification Log MIB,'" edited by R. Kavasseri. Copyright The Internet Society, 2000, pp. 1-26.

"SNMP- Simple Network Managment Protocol," pp. 1-12 [online] [retrieved on Mar. 14, 2002]. Retrieved from http://www.rad.com/networks/1995/snmp/snmp.htm.

DDRI, Diversified Data Resources, Inc. "ACE-SNMP. Web Based SNMP Network Management System. An Introductory Overview." [online] [retrieved on Mar. 14, 2002]. Retrieved from http://www.ddri.com.

Cisco Systems, Inc. "Network Registrar User's Guide. Appendix F. 'SNMP Notification,'" pp. 1-2 [online] [retrieved on Mar. 14, 2001]. Retrieved from http://www.cisco.com/univercd/cc/td/doc/product/rtrmgmt/ciscoasu/nr/nr50/nrug/userapf.pdf.

* cited by examiner

METHOD, SYSTEM, AND PROGRAM FOR TRANSMITTING NOTIFICATION TO AN INPUT/OUTPUT DEVICE

BACKGROUND OF THE INVENTION

1. Field of the Invention

The present invention relates to a method, system, and program for transmitting notification to an Input/Output (I/O) device of an event at an originating device.

2. Description of the Related Art

Most printers today implement a sleep mode where the printer halts the supply of power to various system components. For instance, during sleep mode in a laser printer, the printer may shut down the laser, a mirror engine that moves mirrors that direct the laser beam, a drum that is charged by the laser to attract the toner that is applied to the paper, and a fuser which is heated to pressure and heat seal the print onto the paper. Sleep mode helps increase the longevity of the printer components by reducing the wear and tear on moving parts, reduces the noise of the parts, and reduces energy consumption during periods when the printer is not used.

Printer performance is adversely impacted by the sleep mode because printing may be delayed while the printer has to activate, including power-up, the components lying dormant in sleep mode. In fact, the time to print the first page of a print job is gated by the time to rasterize the data into a bitmap and the time to activate all the components lying dormant in sleep mode, which is longer. Moreover, the time to activate the components may be many times longer than the time to rasterize the data. The printer may receive print job data from an attached computer or from a server that receives print jobs from several attached computers. Many printers in the prior art begin to power-up dormant components in sleep mode upon receiving the first page of data from the spooler.

Printer manufacturers are constantly attempting to improve printer performance to obtain marketing advantages. The time from when the print job is submitted to when the printer stacks the first page of the print job is one popular performance measurement commonly used to judge printer performance. This performance measurement is adversely affected if the print job is large and/or complex because the spooling process to rasterize and buffer the print data takes longer. Further, the technique used by the system submitting the print data can also significantly affect printer performance. The time to print the first page will increase if the system is configured to spool the entire print job before submitting any data to the printer as opposed to submitting data from the spooler before all data is spooled.

For these reasons, there is a continued need in the art to improve printer performance and reduce the time needed to start printing from when the print job was submitted by the application.

SUMMARY OF THE PREFERRED EMBODIMENTS

Provided is a method, system, and program for sending notification to an Input/Output (I/O) device comprised of multiple components of an event from an originating device that transmits data to the I/O device. The originating device detects a notification event and generates a notification message in response to the detected notification event. The notification message is transmitted to the I/O device on a first port at the I/O device. The originating device transmits data to a second port at the I/O device. In response to receiving the notification message on the first port, the I/O device activates at least one of the multiple components.

Additionally provided is a method, system, and program for sending notification to an Input/Output (I/O) device. The originating device transmits data to the I/O device. In response to detecting a notification event before the originating device transmits data to the I/O device, the originating device generates a notification message and transmits the detected notification message to the I/O device. In response to receiving the notification message, the I/O device activates at least one of the multiple components.

In further implementations, the originating device transmits data to the I/O device as part of a data job and the detected notification event is generated in response to processing one data job before any part of the data job is transmitted to the I/O device.

Still further, the notification event may comprise receiving user input related to processing data for transmittal to the I/O device before the processed data is sent to the I/O device.

In additional implementations, the I/O device components render data on an output medium. In such case, the detected notification event is related to processing of output data to transmit to the I/O device for rendering, wherein the notification event is received before the output data is transmitted to the I/O device.

The described implementations provide a methodology formatting an I/O device of a pending data job, such as a print job before the job data is received. The notification is generated and transmitted to the I/O device when the user or program at a system takes an action with respect to processing the job data that is indicative that the job data is more likely to be transmitted to the I/O device for processing. Upon receiving notifications, the I/O device would activate various components previously placed in sleep mode so that all I/O device components are likely to be activated by the time data is actually received. This improves the performance of the I/O device in processing and generating output. Thus, there may be activating, at the I/O device, one component not yet activated in response to each notification message.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
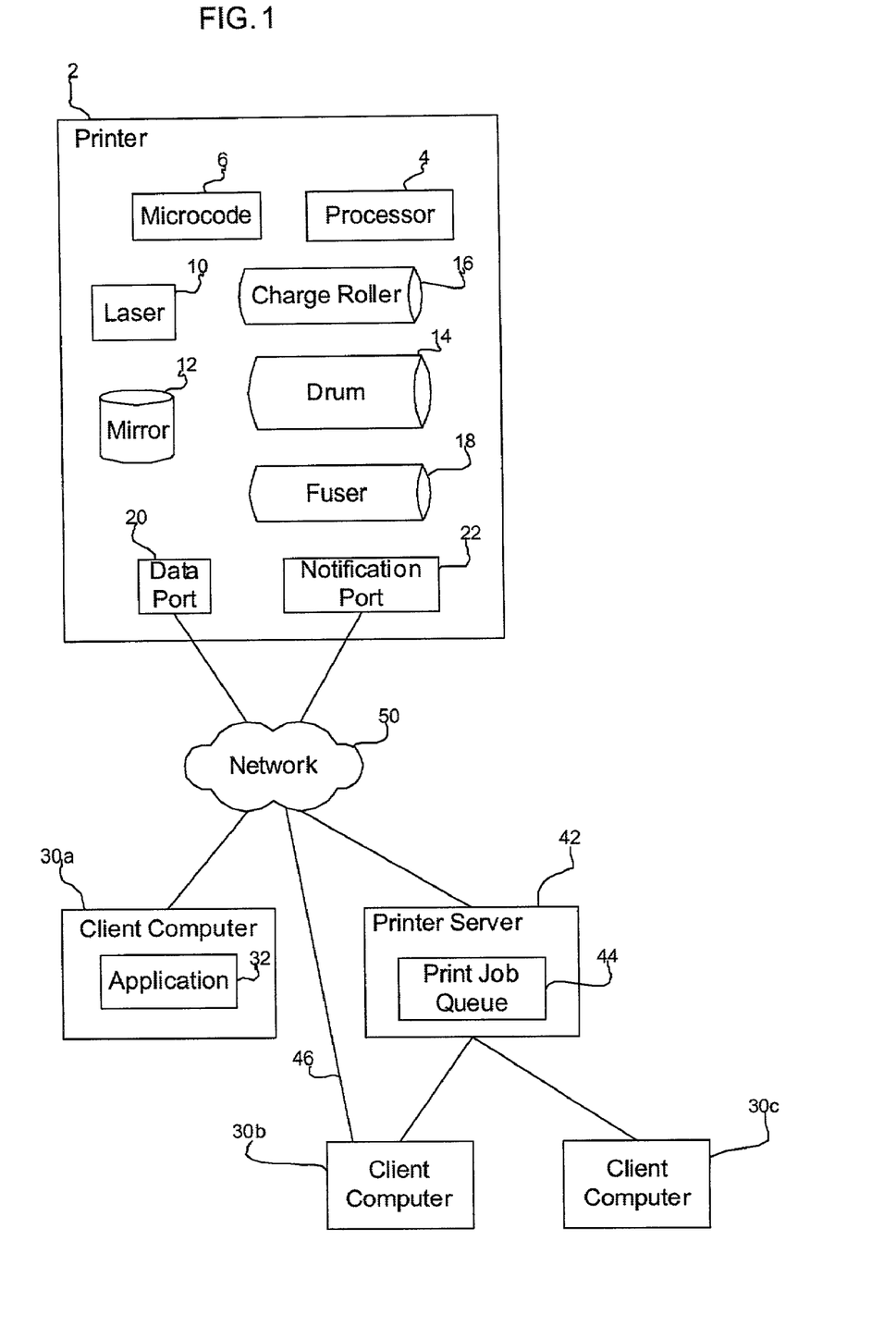
FIG. 1 is an illustration of a computing environment in accordance with certain implementations of the present invention.

FIG. 1 illustrates a computing environment for certain implementations of the invention. A printer 2 includes a processor 4 and microcode 6 including the code the processor 4 executes to perform printer operations. The microcode 6 is preferably implemented in a non-volatile memory, such as a Read Only Memory (ROM), Programmable Read Only Memory (PROM), Electronically Erasable Programmable Read Only Memory (EEPROM), etc. The printer 2 includes various electromechanical components to deposit toner onto a medium such as paper, or any other output medium known in the art In FIG. 1, the printer 2 is a laser printer and includes a laser 10 that switches on and off to generate a light beam that deflects off a mirror 12 to selectively positively charge points on the surface of a rotating drum 14 that represents the output image. Negatively charged toner is attracted to the positively charged points on the drum 14. Paper (not shown) passes through a charge roller 16 that applies a negative charge to the paper. The negative charge on the paper electrostatically attracts the toner on the drum 14, which remains positively charged on the drum 14. A fuser 18 applies pressure and heat to the paper to seal the attracted toner as print onto the paper.

FIG. 1 illustrates two ways print data is communicated to the printer 2. A client computer 30a, which may comprise any computing device known in the art e.g., a server, personal computer, laptop, hand held computer, telephony device, etc., executes an application program 32 which generates image and/or text output to print. Additionally, client computers 30b, c, which also include application programs (not shown) to generate print data, transmit print data to a printer server 42 that maintains a print job queue 44 of print jobs submitted from the client computers 30b, c. The printer server 42 coordinates the transfer of print jobs in the queue 44 to different attached printers 2. The printer server 42 and client computer 30a communicate with the printer 2 over a network 50, which may comprise a Local Area Network (LAN), the Internet, an Intranet, a Wide Area Network (WAN), peer-to-peer network, client/server network, etc. Alternatively, the server 42 (in addition to computer 30a) may also be connected to the printer 2 via a direct cable connection, such as a serial port, parallel port, Universal Serial Bus (USB), Small Computer System Interface (SCSI), etc., or connected using wireless technology, such as a Personal Area Network (PAN), wireless piconet, Bluetooth, infrared, etc.

The printer 2 includes a data port 20 at which print data transmitted from the client computer 30a or print server 40 is received and a notification port 22 for receiving notifications of possible pending print jobs from devices 30a, b, c and 42 on the network 50. The ports 20 and 22 may comprise logical ports that share the same physical connection, i.e., network adaptor card, to the network 50 or may comprise separate physical ports using separate network adaptor cards. If the ports 20 and 22 are logical ports, then their addresses are distinguished by a port number, whereas if the ports 20, 22 are on different network adaptors, then they may have entirely different network addresses.

Figure 2:
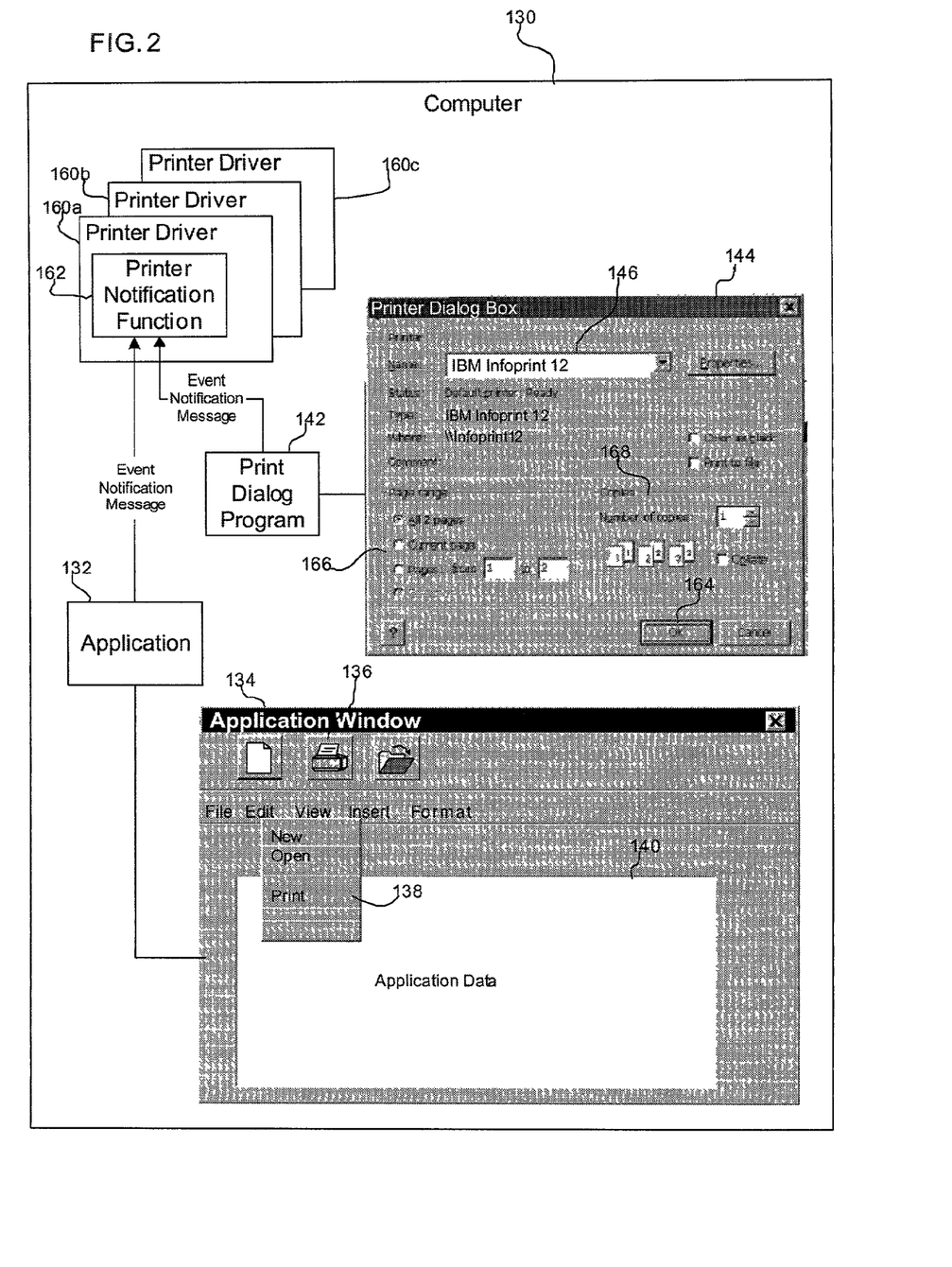
FIG. 2 illustrates components in a client computer to generate a notification message in accordance with certain implementations of the present invention.

FIG. 2 illustrates components within the client computer 130, shown as 30a, b, c in FIG. 1, to generate print data and print job notification messages alerting the printer 2 of a pending print job. Upon receiving the print job notification message, the printer 2 would start activating, i.e., powering-on, various components, e.g., components 10, 12, 14, 16, and 18, in the manner described below so that the printer 2 is fully operational when print job data is eventually received. The computer 130 includes an application program 132 that generates an application window 134 Graphical User Interface (GUI) on a display monitor (not shown) attached to the computer 130. The application window 134 displays graphical mechanisms in the form of icon 136 or menu item 138 to initiate printing of application data 140. The application 132 may comprise any computer application program known in the art that is capable of generating print data, e.g., a word processing program, spreadsheet program, database program, personal information manager (PIM), etc. User activation of printing by selection of one of the graphical mechanisms 136 or 138 causes the application 132 to call a printer dialog program 142 that, in turn, displays a print dialog box 144 GUI in a manner known in the art. For instance, in the Microsoft Windows operating system, the print dialog program 142 is implemented with the PrintDlg function and PRINTDLG data structure that generate the print dialog box.** The displayed print dialog box 144 includes a printer drop down menu 146 through which the user may select one printer 2 or server 42 device to which the print job will be submitted.

Figure 3:
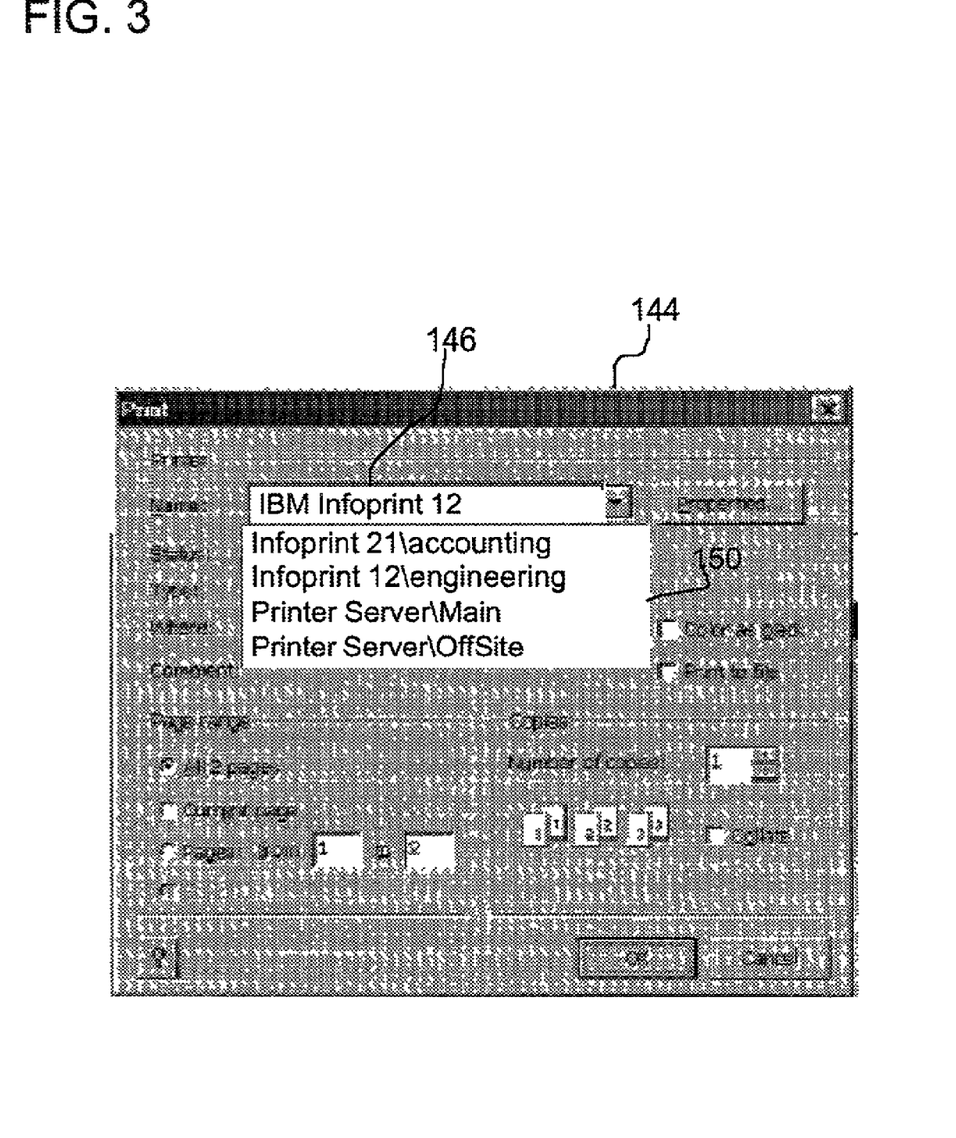
FIG. 3 illustrates a graphical user interface (GUI) for selecting print operations in a manner known in the prior art.

When opened, the print dialog box 144 would display a printer 2 or server device 42 designated as the default device in the printer drop down menu 146. However, the user may select any attached printer server or printer to receive the print job through a drop down menu 146. The print dialog box 144 further includes other print dialog box features and options known in the art. FIG. 3 illustrates the print dialog box 144 displaying a drop down list box 150 of all the available printer servers 42 and printers 2 in the network 50 that the user may select to use in the drop down menu 146.

The computer 130 further includes a plurality of printer drivers 160a, b, c, one for each printer 2 and server 42 to which the computer 30a, b, c can communicate print data. The printer drivers 160a, b, c may include code typically found in printer drivers known in the art. In this respect, the printer driver includes software that generates the print data stream that can be processed by the printer. Printer drivers are capable of supporting several models of printers and often use common commands for different models, but include a model specific commands for a particular printer model. During installation, the printer driver is configured for a particular model printer and connection (e.g., parallel port, TCP/IP LPR over ethernet, etc.), and may generate different commands for different printer models and connections. Further, a user may create multiple printer objects that use the same printer driver, where the printer objects point to different printers of the same or different model, or point to the same printer and use a same or different connection. Still further, different print drivers can be installed for the same printer to handle different data stream formats, e.g., PostScript**, PCL5e, etc.

In addition to including code utilized in printer drivers known in the at, the printer drivers 160a, b, c of the described implementations further include a printer notification function 162 (only one is shown). Upon detection of certain user activity with respect to processing a print job, referred to herein as a notification event, which may involve utilization of the print dialog box 144, the print dialog program 142 or application 132, a call is made to the printer notification function 162 within the printer driver 160a, b, c for a specified printer, which may be the printer or printer server displayed as selected in the drop down menu 146. The printer notification function 162 transmits a print job notification message to a specified printer 2 through the notification port 22 of the printer 2. If the computer 130 is transmitting the notification to a printer server 42, then the printer server 42 may forward the notification message to a printer the printer server 42 designates to handle the submitted print job. Additionally, the client computers 30*c, b* that communicate with the printer 2 through the printer server 42 can communicate the notification message of impending jobs directly through a line, such as line 46, to the printer 2. This allows the client 30*c* to communicate the notification message directly, and not through the printer server 42 to avoid any delays in notifying the printer 2 of the impending print job.

Figure 4:
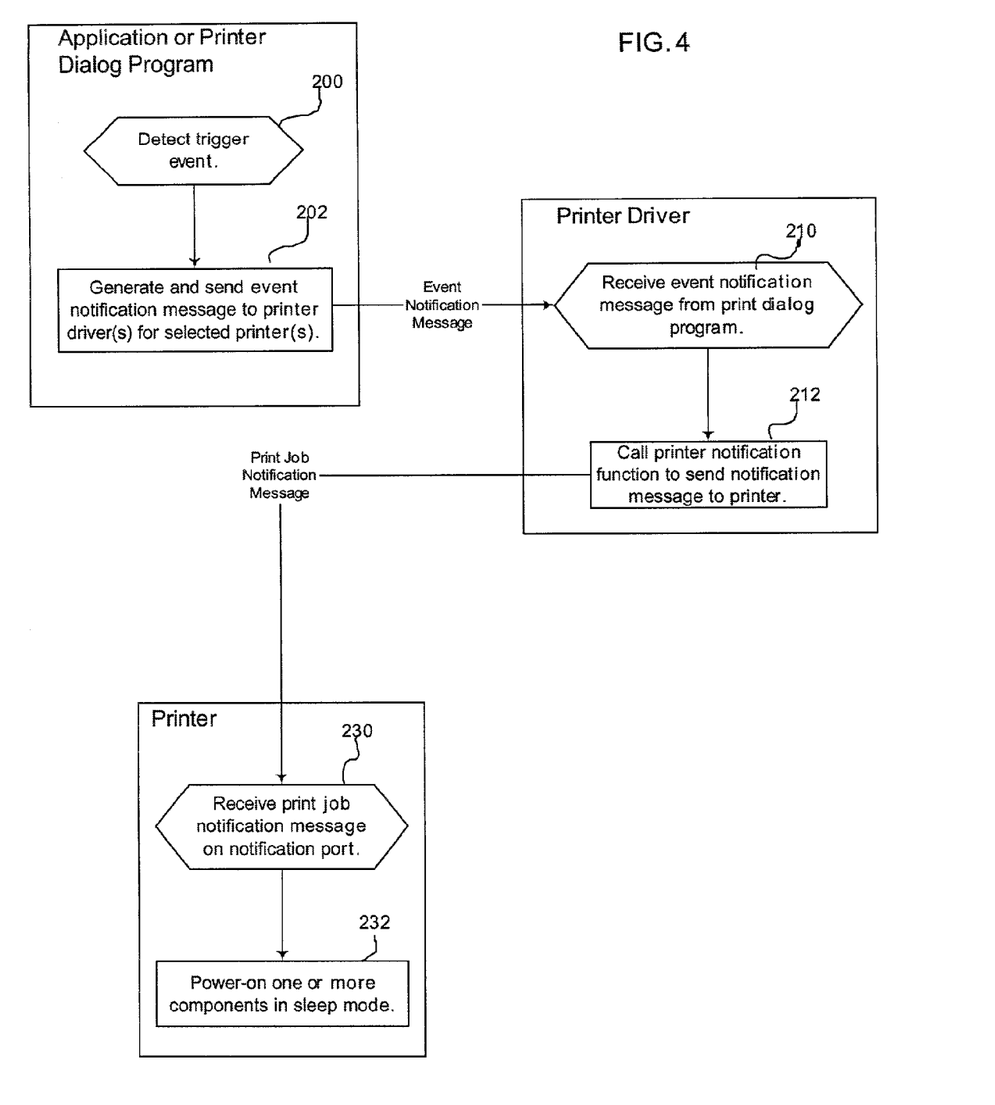
FIG. 4 illustrates logic to generate and process a notification message in accordance with certain implementations of the present invention.

FIG. 4 illustrates logic implemented in the application 132 and printer dialog program 142, printer driver 160*a, b, c,* and printer 2 to generate and handle an event notification message. Control begins at block 200 with the print dialog program 142 detecting a trigger event. The trigger event may be caused by one of the following events:

- a user through the application window 134 selecting the printer mechanisms 136 or 138 to open the printer dialog box 144.
- a user submitting the print job by selecting the OK button 164 (FIG. 2) in the printer dialog window 144.
- a user selecting from the drop down list 150 (FIG. 3) a different printer 2 or server 42 from the one displayed in the printer drop down menu 146.
- a user formatting the application data 40 from within the application window 134. In such case, the user selection of a formatting option within the application window 134 would cause the application 132 to generate an event notification message to the printer driver 160*a, b, c*. The application 132 would send the event notification to the default printer or printer server.

Upon either the application 132 or print dialog program 142 detecting a trigger event, the print dialog program 142 or application 132 would generate and send (at block 202) an event notification message to the printer driver 160*a, b, c*. The application 132 or print dialog program 142 can transmit the event notification message to the default printer, which would be the printer or printer server displayed in the printer drop down menu 146. Additionally, the application 132 or print dialog program 142 could send the event notification message to every printer and printer server having a printer driver 160*a, b, c* installed on the computer 130. For instance, the event notification message could be sent to the printer drivers for all the printers and/or printer servers listed in the list box 150. In this way, all printers 2 and printer servers 42 to which the computer 130 is connected would receive an initial notification message as any one of these devices may be eventually selected to render the print job.

In further implementations, if a specific printer or server is actually selected for the job or the job is transmitted to a particular printer or server, then the printer notification function 162 may transmit "stand down" messages to the other printers or servers that received the initial notification messages to return to sleep mode as they are no longer likely to receive the print job.

Blocks 210 and 212 in FIG. 4 are performed by the printer driver 160*a, b, c*. At block 210, the one or more printer driver 160*a, b, c* receives the event notification message from the application 132 or print dialog program 142. In response, the recipient printer drivers 160*a, b, c* call the printer notification function 162 to build and send a message to the notification port 22 on the printer 2 or printer server 142 represented by the printer driver 160*a, b, c*. As discussed in certain implementations, each printer driver includes printer notification functionality 162.

Blocks 230 and 232 are logic implemented in the printer microcode 6 to handle a print job notification message received on the notification port 22 at block 230. In response, at block 232, the printer 2 activates one or more of the printer components 10, 12, 14, 16, 18, or any other component not shown in FIG. 1, that are in sleep mode.

In additional implementations, the application 132 and print dialog program 142 may generate different event notification messages for different types of user actions. For instance, the application program 132 may generate a first notification message in response to the user formatting the application data 140. The printer dialog program 142 may then generate additional notification messages for separate actions the user takes to open the print dialog box 144 and actions within the print dialog box 144 GUI. For instance, a second event notification message may be generated when the user selects an additional job formatting feature from the page range 166 and copies 168 sections of the print dialog box 144 shown in FIG. 2. A yet further event notification message may be generated if the user selects a printer from the drop down list 150 (FIG. 3) in the drop down menu 146 and a final event notification message may be generated upon selection of the OK button 164 to send the print job.

In implementations with multiple event notification points, the printer notification function 162 would generate a print job notification that specifies the notification level corresponding to the specific event that triggered the event notification. The printer 2 upon receiving the print job notification would activate a component that is associated with the notification level. For instance, upon receiving the initial notification message, the printer 2 may activate the component that takes the longest time to power-up, additional components requiring increasingly less time to activate would be activated in response to subsequent print job notification messages at later notification levels. In this way, the printer 2 incrementally activates components 10, 12, 14, 16, and 18 as the programs 132 or 142 generate event notifications. The more event notifications generated increases the likelihood that the print job will be sent. Thus, there may be activating, at the I/O device, one component not yet activated in response to each notification message.

With the above described printer notification technique, the printer 2 receives notification in advance of receiving the print data In this way, by the time the printer 2 starts to receive data, the printer 2 will already have completed powering-on and activating all the components previously in sleep mode. This eliminates any delays in printing the first page that would previously have been attributed to the sleep mode. In the prior art, the computer 130 or printer server 42 spooler would notify the printer 2 of a pending print job after rendering all or a portion of the print data for the print job. With the described implementations, the printer 2 is notified of a pending print job before receiving any data and, perhaps, before any print data is rendered, thus allowing the printer to activate and power-up the components 10, 12, 14, 16, 18 before any data is received. This ensures that the printer 2 is fully operational at the time print data is received from the client computer 30*a* or printer server 42.

In certain implementations, the printer notification function 162 can utilize the Simple Network Management Protocol (SNMP). The Simple Network Management Protocol is a standardized protocol for sending network management commands to network devices and receiving status information from the network devices. With SNMP, different network devices can query other devices for status information and control operations on remote devices. In such SNMP implementations, the printer 2 would maintain a management information base (IB) of objects. Each object is named with an object identifier (OID) and is defined in the MIB database of the printer 2.

In one SNMP implementation, the printer 2 would include a notification OID and code associated with the OID, such that whenever a printer 2 or printer server 42 attempts to access the OID, the printer 2 would proceed to activate one or more of the components in sleep mode. The printer notification function 162 could attempt access of the OID using an SNMP GET or SET operation to the notification OID. Such access attempt could cause the printer 2 to activate one or more components 10, 12, 14, 16, 18, etc., associated with the notification OID. The SNMP GET operation is effectively a request to access or read a particular OID object and the SNMP SET operation is effectively a request to alter or write to the notification OID.

For these SNMP implementations, the printer notification function 162 would generate an SNMP GET or SET to the notification OID and submit this SNMP request to the printer 2. Alternatively, the printer notification function 162 can send an SNMP trap to the printer 2 in a manner known in the art to notify the printer 2 of the notification event. Still further, the printer notification function 162 can operate as an SNMP notification originator application, in a manner known in the art, to generate notification class messages to the printer 2 concerning event notifications from the application 132 or print dialog program 142. The printer notification function 62 may transmit the SNMP request to the notification port 22 using the User Datagram Protocol (UDP) in a manner known in the art.

In implementations where the printer notification function 162 generates different levels of notifications in response to different user events with respect to the application window 134 and print dialog box 144, each specific notification level would be implemented with a different OID in the printer 2 MIB. Thus, to notify the printer 12 of notification level i, the printer notification function 162 would generate an SNMP request with respect to the OID for notification level i, which would cause the printer 12 to activate the components specified with a level i OID notification. Alternatively, different notification levels can be implemented as different values or fields within the same OID.

Still further, the notification OIDs in the printer 2 may be associated with a community name. In such case, to access the notification OID, the printer notification function 162 would transmit the appropriate community name for the notification OID with the SNMP request. If the notification is implemented by having the printer notification function 162 submit a SNMP read or GET request, then a standard community name may be used, such as "PUBLIC". However, utilizing a common or standard community name subjects the printer 2 to possibly receiving inadvertent or wrong read (GET) requests for the notification OID that wrongfully trigger the printer 2 to activate the components. If the notification is implemented with an SNMP write or SET request that requires submission of a community name, then it is less likely that the printer 2 would receive a notification, i.e., SNMP SET request, for the notification OID from a device not intending to submit print data. To further reduce the likelihood of an inadvertent notification, the printer 2 may require that the SNMP SET request with respect to the notification OID include a specific value, such that the printer 2 will not activate components unless the SET request includes a specific code value.

In yet alternative implementations, the printer code 6 could specify a notification event whenever a packet is written to the notification port 22. In such case, the printer code 6 may not even bother reading the packet, as the mere presence of the packet on the notification port 22 would trigger the printer 2 to activate the corresponding component(s). In the event that the printer 2 is capable of providing different activation levels in response to different notification events, the printer would read the contents of the packet written to the notification port 22, which would specify a particular notification level.

Additional Implementation Details

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The program flow logic described in the flowcharts above indicated certain events occurring in a certain order. Those skilled in the art will recognize that the ordering of certain programming steps or program flow may be modified without affecting the overall operation performed by the preferred embodiment logic, and such modifications are in accordance with the preferred embodiments.

Preferred embodiments were described with respect to printers as the devices subject to the notification. However, in alternative implementations, the notification methodology described herein may apply to any type of device attached to the network or computer, where the client computers generate notification messages upon the occurrence of certain notification events at the computer that cause the device receiving the notification message to activate certain components or take some other action in response to the notification.

The GUI panels shown in FIGS. 2 and 3 are for illustrative purposes. Graphical design elements and GUI functions may be added and removed without departing from the invention. Moreover, GUI displays are not required at all. Alternative embodiments could include any sort of input means in which the user requests an application to print. For instance, notification event messages may be generated in response to the user entering printing related commands onto a command line interface or in response to receiving printer related voice commands.

Certain implementations utilized the SNMP protocol to implement the messaging system. However, those skilled in the art will appreciate that any network messaging protocol may be used to enable the communication of notification messages between the client computers and I/O device.

Certain of the described implementations involved managing the operations of printer devices. However, the notification system described herein may be applied to any network system in which a computer monitors and communicates with one or more attached components. The implementations are not limited to only printers and related I/O devices. For instance, the notification system could apply to providing notification messages to trigger activation operations in facsimile machines, copiers, telephones, display devices, input/output devices, storage devices, communication systems, routers, brouters, switches etc., in communication with the computers that generate notification events.

The notification events described herein that triggered the notification function to transmit a notification message to the printer concerned user activity with respect to formatting, preparing and transmitting a print job. In alternative implementations, the notification events may be unrelated to printer operations and concern any type of user action with respect to any application program. Moreover, in certain implementations, the notification events may be generated in response to certain states occurring within the computer system that are not triggered or caused by user selection or input, but instead based on the state of a process executing within the client computer.

In the described implementations, the printer received the notification message on a port that is different from the port on which data is received. In alternative implementations, the printer may receive notification messages and data on the same port.

The described printer comprised a laser printer with laser printer components 10, 12, 14, 16, and 18 (FIG. 1). In alternative implementations, the printer may comprise a non-laser printer, such as a thermal printer, dot matrix printer, ink jet, line printer, LED printer, daisy wheel, or any other type of printer device known in the art. In such case, the printer would activate the electronic or electro-mechanical components within the printer in response to the one or more notification messages.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for sending notification to an Input/Output (I/O) device comprised of multiple components of an event from an originating device that transmits data to the I/O device, comprising:
    at least partially generating, at the originating device, a data job wherein the generating includes a plurality of notification events;
    detecting, at the originating device, a first of said notification events that occurs before the originating device transmits data to the I/O device;
    generating, at the originating device, a first notification message in response to the detected first notification event;
    transmitting the first notification message to the I/O device;
    transmitting the data job after transmitting the notification message;
    in response to receiving the first notification message, activating, with the I/O device, at least one of the multiple components prior to the transmission of the data job;
    detecting, at the originating device, at least one subsequent notification event following the first notification event;
    generating, at the originating device, a subsequent notification message following the first notification message for each detected notification event;
    transmitting each generated notification message to the I/O device; and
    activating, at the I/O device, one component not yet activated in response to each notification message.

2. The method of claim 1, wherein wherein the data generating includes processing data to be subsequently transmitted to the I/O device, and wherein a detected notification message is generated in response to processing data far the data job before any processed data of the data job is transmitted to the I/O device.

3. The method of claim 1, wherein the notification event comprises:
    receiving user input related to said processing data for transmittal to the I/O device before the processed data is sent to the I/O device.

4. The method of claim 3, wherein the received user input is related to a graphical user interface (GUI) window used to process the data for transmittal.

5. The method of claim 1, further comprising transmitting a stand down notification message to a second I/O device.

6. The method of claim 5, wherein each detected notification event is generated in response to an action that is different from actions that caused the generation of other notification events.

7. The method of claim 5, further comprising, in response to receiving the stand down notification messages, returning within the second I/O device to a sleep.

8. The method of claim 5, wherein at least one notification event that causes the originating device to generate one notification message comprises receiving user input related to a graphical user interface (GUI) window used to process the data for transmittal.

9. The method of claim 8, wherein one detected notification event is generated in response to user input causing the display of the GUI window and wherein one subsequent detected notification event is generated in response to user input within the GUI window to process the data to be transmitted.

10. The method of claim 1, wherein the I/O device components render data on an output medium, wherein a detected notification event is related to processing of output data to transmit to the I/O device for rendering, wherein a notification event is received before the output data is transmitted to the originating device.

11. The method of claim 10, wherein a detected notification event is generated in response to receiving user input related to a graphical user interface (GUI) window used to process the output data.

12. The method of claim 10, wherein the I/O device comprises a printer, and the data job comprises a print job which comprises the output data.

13. The method of claim 1, further comprising:
  transmitting, with the originating device, the notification message to a server that receives the data the originating device transmits to the I/O device; and
  transmitting, with the server, the notification message to the I/O device.

14. The method of claim 1, wherein the originating device transmits data to the I/O device through a server, and wherein the originating device directly transmits the notification message to the I/O device, thereby bypassing the server.

15. The method of claim 1, wherein the originating device generates the notification message to the I/O device using the SNMP protocol.

16. A system for sending notification to an Input/Output (I/O) device comprised of multiple components, comprising:
  means for at least partially generating, at the originating device, a data job wherein the generating includes a plurality of notification events;
  means for transmitting data to the I/O device;
  means for detecting a first of said notification events that occurs before the originating device transmits data to the I/O device;
  means for generating a first notification message in response to the detected first notification event;
  means for transmitting the notification message to the I/O device and for subsequently transmitting the data job, wherein the I/O device activates at least one of the multiple components prior to the data job transmission and in response to receiving the notification message;
  means for detecting at least one subsequent notification event following the first notification event;
  means for generating a subsequent notification message following the first notification message for each detected notification event; and
  means for transmitting each generated notification message to the I/O device wherein the I/O device activates, one component not yet activated in response to each notification message.

17. The system of claim 16, wherein the data job generating includes processing data to be subsequently transmitted to the I/O device, and wherein a detected notification message is generated in response to processing data for the data job before any processed data of the data job is transmitted to the I/O device.

18. The system of claim 16, further comprising:
  means for receiving user input related to processing data for transmittal to the I/O device before the processed data is sent to the I/O device, wherein a notification event is detected in response to receiving the user input.

19. The system of claim 18, wherein the received user input is related to a graphical user interface (GUI) window used to process the data for transmittal.

20. The system of claim 19, wherein at least one notification event that causes the originating device to generate one notification message comprises receiving user input related to a graphical user interface (GUI) window used to process the data for transmittal.

21. The system of claim 20, wherein one detected notification event is generated in response to user input causing the display of the GUI window and wherein one subsequent detected notification event is generated in response to user input within the GUI window to process the data to be transmitted.

22. The system of claim 16, further comprising:
  means for transmitting a stand down notification message to a second I/O device wherein the second I/O device, in response to receiving the stand down notification message, returns to a sleep mode.

23. The system of claim 22, wherein each detected notification event is generated in response to an action that is different from actions that caused the generation of other notification events.

24. The system of claim 16, wherein the I/O device components render data on an output medium, wherein the detected notification event is related to processing of output data to transmit to the I/O device for rendering, wherein a notification event is received before the output data is transmitted to the originating device.

25. The system of claim 24, wherein a detected notification event is generated in response to receiving user input related to a graphical user interface (GUI) window used to process the output data.

26. The system of claim 16, wherein the system is in communication with a server, further comprising:
  means for transmitting a notification message to the server that receives the data transmitted to the I/O device, wherein the server transmits the notification message to the I/O device.

27. The system of claim 16, wherein data is transmitted to the I/O device through a server, and wherein a notification message is directly transmitted to the I/O device, thereby bypassing the server.

28. The system of claim 16, wherein the originating device generates a notification message to the I/O device using the SNMP protocol.

29. An Input/Output (I/O) device connected to an originating device, wherein the originating device transmits data to the I/O device, comprising:
  multiple components;
  first and second ports;
  means for receiving a plurality of notification messages on the first port, wherein each notification message is generated and transmitted by the originating device in response to the originating device detecting a notification event in connection with generation of a data job by the originating device;
  means for subsequently receiving data of the data job transmitted from the originating device on the second port; and
  means for activating a plurality of the multiple components in response to receiving the notification message on the first port before the transmission of the data job and before receiving the data on the second port wherein the means for activating the components in response to the notification message activates at least one component not yet activated in response to each notification message.

30. The I/O device of claim 29, wherein the means for activating the components in response to the notification messages activates a third component not yet activated in response to a third notification message.

31. The I/O device of claim 29, wherein the I/O device comprises a printer, and the output data comprises a print job.

32. An article of manufacture implemented in an originating device for sending notification to an Input/Output (I/O) comprised of multiple components comprising:
  at least partially generating, at the originating device, a data job wherein the generating includes a plurality of notification events;
  detecting a first of said notification events that occurs before transmitting data to the I/O device;

generating a first notification message in response to the detected first notification event; and transmitting the first notification message to the I/O device and subsequently transmitting the data job, wherein the I/O device activates at least one of the multiple components prior to the transmission of the data job and in response to receiving the first notification message;

detecting at least one subsequent notification event following the first notification event;

generating a subsequent notification message following the first notification message for each detected notification event; and transmitting each generated notification message to the I/O device wherein the I/O device activates, one component not yet activated in response to each notification message.

33. The article of manufacture of claim 32, wherein the data job generating includes processing data to be subsequently transmitted to the I/O device, and wherein a detected notification message is generated in response to processing data for the data job before any processed data of the data job is transmitted to the I/O device.

34. The article of manufacture of claim 32, further comprising:

receiving user input related to said processing data for transmittal to the I/O device before the processed data is sent to the I/O device, wherein a notification event is detected in response to receiving the user input.

35. The article of manufacture of claim 34, wherein the received user input is related to a graphical user interface (GUI) window used to process the data for transmittal.

36. The article of manufacture of claim 35, wherein at least one notification event that causes the originating device to generate one notification message comprises receiving user input related to a graphical user interface (GUI) window used to process the data for transmittal.

37. The article of manufacture of claim 36, wherein one detected notification event is generated in response to user input causing the display of the GUI window and wherein one subsequent detected notification event is generated in response to user input within the GUI window to process the data to be transmitted.

38. The article of manufacture of claim 32, further comprising:

transmitting a stand down notification message to a second I/O device wherein the second I/O device, in response to receiving the stand down notification message, returns to a sleep mode.

39. The article of manufacture of claim 38, wherein each detected notification event is generated in response to an action that is different from actions that caused the generation of other notification events.

40. The article of manufacture of claim 32, wherein the I/O device components render data on an output medium, wherein a detected notification event is related to processing of output data to transmit to the I/O device for rendering, wherein a notification event is received before the output data is transmitted to the originating device.

41. The article of manufacture of claim 40, wherein a detected notification event is generated in response to receiving user input related to a graphical user interface (GUI) window used to process the output data.

42. The article of manufacture of claim 32, wherein the system is in communication with a server, further comprising:

transmitting a notification message to the server that receives the data transmitted to the I/O device, wherein the server transmits a notification message to the I/O device.

43. The article of manufacture of claim 32, wherein data is transmitted to the I/O device through a server, and wherein a notification message is directly transmitted to the I/O device, thereby bypassing the server.

44. The article of manufacture of claim 32, wherein the originating device generates a notification message to the I/O device using the SNMP protocol.

45. An article of manufacture implemented in an Input/Output (I/O) device including first and second ports and connected to an originating device, wherein the originating device transmits data to the I/O device, wherein the article of manufacture activates components in the I/O device by:

receiving a plurality of notification messages on the first port, wherein each notification message is generated and transmitted by the originating device in response to the originating device detecting a notification event in connection with generation of a data job by the originating device;

subsequently receiving data of the data job transmitted from the originating device on the second port; and activating a plurality of the multiple components in response to receiving the notification messages on the first port before the transmitted data job and before receiving the transmitted data on the second port wherein the components are activated in response to the notification messages by activating at least one component not yet activated in response to each notification message.

46. The article of manufacture of claim 45, wherein the components are activated in response to the notification messages by activating a third component not yet activated in response to a third notification message.

* * * * *